W. GOURLEY.
Revolving Harrow.
No. 13,257.
Patented July 17. 1855.
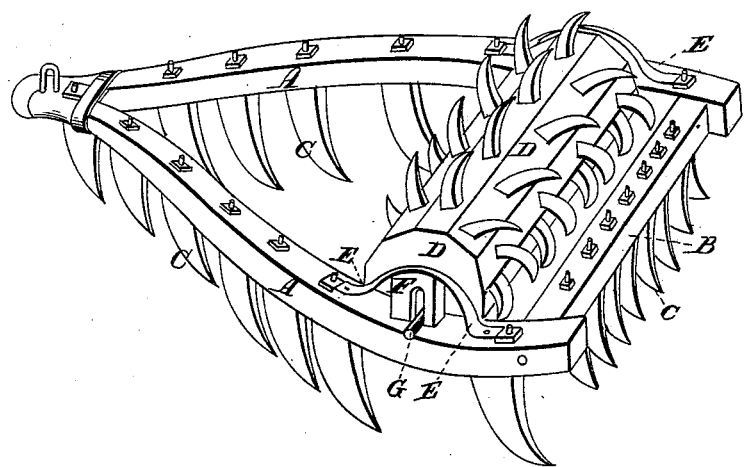
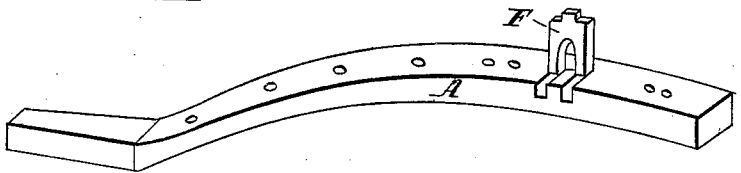

UNITED STATES PATENT OFFICE.

WM. GOURLEY, OF CLARKE COUNTY, VIRGINIA.

IMPROVEMENT IN HARROWS.

Specification forming part of Letters Patent No. 13,257, dated July 17, 1855.

*To all whom it may concern:*

Be it known that I, WILLIAM GOURLEY, in the county of Clarke, in the State of Virginia, have invented a new and useful Improvement in Machines for Cutting Clods and Rolling Land; and I do hereby declare that the following is a full and exact description thereof, reference being had to the accompanying drawings, and to the letters of reference marked thereon.

The nature of my improvements or invention consists of a triangular shaped frame, with a self-adjustable roller combined.

In Figure 1 the side pieces, A, and the crosspiece B form the frame, with roller D just in front of B. The frame contains twenty curved knives, C, about eight inches long and two inches wide. The knives are made with a shank to pass through the frame, and fasten above by screw and tap. As the frame is drawn forward the knives follow sharp-edge front on lines parallel with each other. The curved shape of the knives causes them to press the clods down somewhat, thereby decreasing the tendency to shift right and left and to escape the action of the knives, as is the case where the knives are straight and fall perpendicular from the frame. The roller is a solid block, about sixteen inches in diameter, with a journal, G, at each end. The journal-shaft M in Fig. 2 is driven some six inches into the roller. The journal works in slots or mortises in standards F, which said slots or mortises are perpendicular, and of such length as will allow the roller to rise or fall, as circumstances require. The standards are let into the frame and kept in position by guard E.

Roller D is armed with knives similar to those in the frame, but smaller, and designed to cut such clods as may escape those in the frame, the surface of the roller meantime compressing the ground.

If additional weight is desired on the frame, it is effected by placing boxes L under the journals, as shown in Fig. 3. It will be observed that the roller bears heaviest upon the frame when it presses only partially on the ground.

Having fully described my invention and the manner of its operation, I do not claim any of the parts separately; nor do I claim so attaching to a clod-cutter or harrow a roller that may be adjusted to any given height from the ground, as this has been done before; but What I do claim is—

Arranging in connection with a clod-cutter a cutting-roller which may adapt itself to the inequalities of the ground, and also be made to throw its weight upon the clod-cutter or not, as desired, substantially in the manner and for the purpose set forth.

WILLIAM GOURLEY.

Witnesses:
JOHN DOW,
JOHN W. CARY.